United States Patent [19]

Stiff

[11] Patent Number: 4,550,552
[45] Date of Patent: Nov. 5, 1985

[54] SUGAR CANE HARVESTING METHOD AND APPARATUS

[75] Inventor: Rodney A. Stiff, Bundaberg, Australia

[73] Assignee: Toft Bros. Industries Ltd., Bundaberg, Australia

[21] Appl. No.: 280,544

[22] Filed: Jul. 6, 1981

Related U.S. Application Data

[63] Continuation of Ser. No. 64,437, Aug. 7, 1979, abandoned.

[30] Foreign Application Priority Data

Aug. 16, 1978 [AU] Australia .............................. PD5515

[51] Int. Cl.⁴ ............................................. A01D 45/10
[52] U.S. Cl. ........................................ 56/13.9; 56/505
[58] Field of Search ................... 56/13.9, 14.5, 14.3, 56/13.3, 500, 504, 505

[56] References Cited

U.S. PATENT DOCUMENTS

| | | | |
|---|---|---|---|
| 1,903,335 | 4/1933 | Falkiner | 56/13.9 |
| 2,888,795 | 6/1959 | Lundell | 56/505 |
| 3,100,370 | 8/1963 | Blanshine | 56/13.9 |
| 3,331,417 | 7/1967 | Romer | 56/505 |
| 3,491,523 | 1/1970 | Bornzin | 56/13.9 |
| 3,530,650 | 9/1970 | Phillips | 56/13.9 |
| 3,673,774 | 7/1972 | Mizzi | 56/13.3 |
| 3,925,969 | 12/1975 | Shuniski | 56/62 |
| 3,950,924 | 4/1976 | Quick | 56/14.3 |
| 4,065,912 | 1/1978 | Quick | 56/13.9 |
| 4,070,809 | 1/1978 | Sonlat | 56/13.9 |

FOREIGN PATENT DOCUMENTS

| | | | |
|---|---|---|---|
| 608965 | 11/1960 | Canada | 56/14.3 |
| 2310065 | 11/1976 | France | 56/13.9 |

Primary Examiner—Paul J. Hirsch
Attorney, Agent, or Firm—Wenderoth, Lind & Ponack

[57] ABSTRACT

A cane harvester for harvesting sugar cane. A cutter severs the cane and feed means feeds the cane along a longitudinal feed path to a chopping means which cuts the cane into billets. A discharge discharges the billets from the harvester. The chopping means comprises longitudinal, movable blades which rotate about an axis perpendicular to the feed path and which sweep out a cylindrical or frusto-conical path. A fixed blade cooperates with the movable blades which move upwardly past the fixed blade. A billet engaging means located between the axis and the movable blade engages and pretensions the cane prior to cutting. After cutting, the cane billets are thrown upwardly and away from the chopping means into the discharge chute.

8 Claims, 3 Drawing Figures

SUGAR CANE HARVESTING METHOD AND APPARATUS

INTRODUCTION

This is a continuation of application Ser. No. 064,437 filed Aug. 7, 1979, now abandoned.

The present invention relates to improved apparatus for harvesting sugar cane including improved feed means, improved cutter means and improved trash separation means.

BACKGROUND OF THE INVENTION

In conventional cane harvesters stalks of cane are "topped" to remove the leafy top of the cane, cut at their base, and fed butt first by feed rollers into cutter means which severs the cane into billets. The cutter means conventionally comprise a pair of counter rotating blades which are so controlled that they periodically come together to sever the stalks of cane into billets of a predetermined length. The billets then fall from the cutting means into a bin from whence they are transported by conventional conveyor means to a discharge point of the harvester. The sugar cane stalks fed to the harvester are accompanied by considerable quantities of trash comprising leaves of the cane plant and other unwanted vegetable matter. This trash is conventionally separated from the cane after it has been severed into billets by the use of extractor fans which produce a suction draught drawing the trash upwardly away from the cane billets and by the use of slatted floor conveyors which allow dirt and other small portions of trash to drop through the conveyor.

Australian patent specification 257,323 discloses a cane harvester with chopping means comprising a blade mounted to rotate in a plane and to move downwardly past a feed path for sugar cane stalks and to co-operate with a fixed blade below the feed path to sever the sugar cane into billets. Throwing plates are provided to project perpendicularly to the blade to engage the cut billets and, after moving them around a circular chute, to throw them upwardly. This arrangement suffers from a first disadvantage in that the direction of travel of the cut billets must be changed through 180° thereby using unnecessary energy. The use of a blade moving in a plane has further the disadvantage that the cutting velocity of the blade is increased as one moves radially outwardly along the blade This results in an uneven departure velocity for the cut billets. In the arrangement according to specification 257,323 the cut billets must be thrown radially outwardly until they hit the semicircular chute before being contacted by the throwing plate. This contact with the chute can give rise to physical damage to the billets which reduces their sugar content particularly at the relatively high speeds of the movable blade.

SUMMARY OF THE INVENTION

According to the present invention, there is disclosed a cane harvester comprising cutter means to cut cane, feed means to feed said cut cane longitudinally along a feed path, chopping means to chop said cane into billets, billet engaging means to engage said cane and billets and a discharge chute to discharge billets from said cane harvester, said chopping means comprising longitudinal movable blade means rotatable about an axis and operable to sweep a substantially cylindrical or frusto-conical path, fixed blade means mounted on said feed path and cooperating with said movable blade means, said movable blade means movable upwardly past said fixed blade means, said billet engaging means being located between said axis and said movable blade means and being rotatable with said movable blade means, said billet engaging means being operable to engage and pretension said cane prior to said cane being cut into billets and to throw said cut billets upwardly and away from said chopping means into said discharge chute.

The billet chopping means according to the present invention has in practice been found to be capable of at least partially separating the severed billets from the associated trash due to the fact that the greater mass of the billets causes them to be thrown positively away from the billet chopping means whereas the trash tends to be carried round with the rotating blade and to drop downwardly out of the underside of the cane harvester. The fact that the trash can be directed downwardly from the underside of the cane harvester is an advantage over the prior art arrangement wherein the trash tends to be discharged upwardly out of the harvester with the result that it is blown indiscriminately into the environment. The throwing action of the billet chopping means of the present invention is enhanced by the presence of billet engagement means between the movable blade and its axis of rotation.

The billet chopping means preferably comprises a spindle, a pair of spaced apart annular plates connected to the spindle and extending outwardly from the spindle, the cutter blade interconnecting peripheral edge portions of each of the annular plates, the billet engagement means connected to the flanges intermediate the spindle and the blade sets.

The billet engagement means may comprise a rod or bar extending substantially parallel to the spindle intermediate the spindle and the blade and a plate may be provided between the spindle and the blade extending over a part of all of the space defined therebetween. In a preferred form of the invention, the billet engagement means is so arranged that the cane stalks extending beyond the anvil of the cutter means are engaged by the billet engaging means immediately prior to the blade commencing to sever the billets from the cane.

The desired trajectory of billets thrown outwardly of the billet chopping means has been found to be dependent in large part on the position of the point of contact of the billet engagement means with the billets of cane, i.e. the leading edge of the billet engagement means, relative to the notional radial line extending from the centreline of the spindle to the leading edge of the blade. It has been found that the point of contact should preferably be in front, in a rotational sense, of that notional radius to achieve a good throwing action having a substantial upward component and some backward component. The most desirable position of the engagement means relative to the spindle and the blade may be determined by routine experimentation. It is, however, desirable that the leading edge of the engagement means be closer to the blade than to the spindle for any given design of harvester.

In order to achieve smoother cutting of the cane stalks into billets it is desirable to have a plurality of blade segments mounted on the spindle. These blade segments are preferably spaced apart along the length of the spindle as well as being spaced apart radially around the spindle. The movable blade may for instance be a single blade or it may comprise a pair of blade separated by 180°, each extending along half of the length of the spindle. Many other arrangements having a larger number of blade segments can be envisaged. It is also desirable for the further smoothing of the cutting action that the longitudinal axis of each blade segment be inclined relative to the longitudinal axis of the spindle. If a single blade is used it may be, for instance, helical or a plurality of straight blade segments may be each arranged about the spindle and inclined to its longitudinal axis to form a quasi helical blade structure. As an inclined blade will tend to give rise to the severed billets being thrown sideways to some extent it had been found that the most advantageous arrangement is to have a pair of blade segments each extending along half of the length of the spindle and being offset from one another by 180°. Each of these blade segments preferably has its longitudinal axis inclined to the longitudinal axis of the spindle by from 5° to 20°, and the inclination of the two blade segments being in opposite senses and towards one another. Such an arrangement has the effect of directing all severed billets towards a centralised location.

It is further preferred that the blade, or each blade segment, lies in a plane which is inclined to the longitudinal axis of cane stalks being fed to it by an angle of from 60° to 80°, preferably 70°. It has been found that by angling the plane of the blade relative to the longitudinal axis of the cane stalks a more positive throwing action is achieved by the cutter means. It should be noted from this latter comment that the present inventors do not wish to be tied to any particular theory as to which part of the cutter means actually achieves the throwing action. It is, however, probable that both the cutter blade and the engagement means both contribute to this action.

BRIEF DESCRIPTION OF THE SEVERAL VIEWS OF THE DRAWINGS

An embodiment of the invention will now be described, by way of example only, with the use of drawings in which.

Hereinafter given by way of example only is a preferred embodiment of the present invention described with reference to the accompanying drawings in which.

DETAILED DESCRIPTION OF SPECIFIC EMBODIMENT

Figure 1:
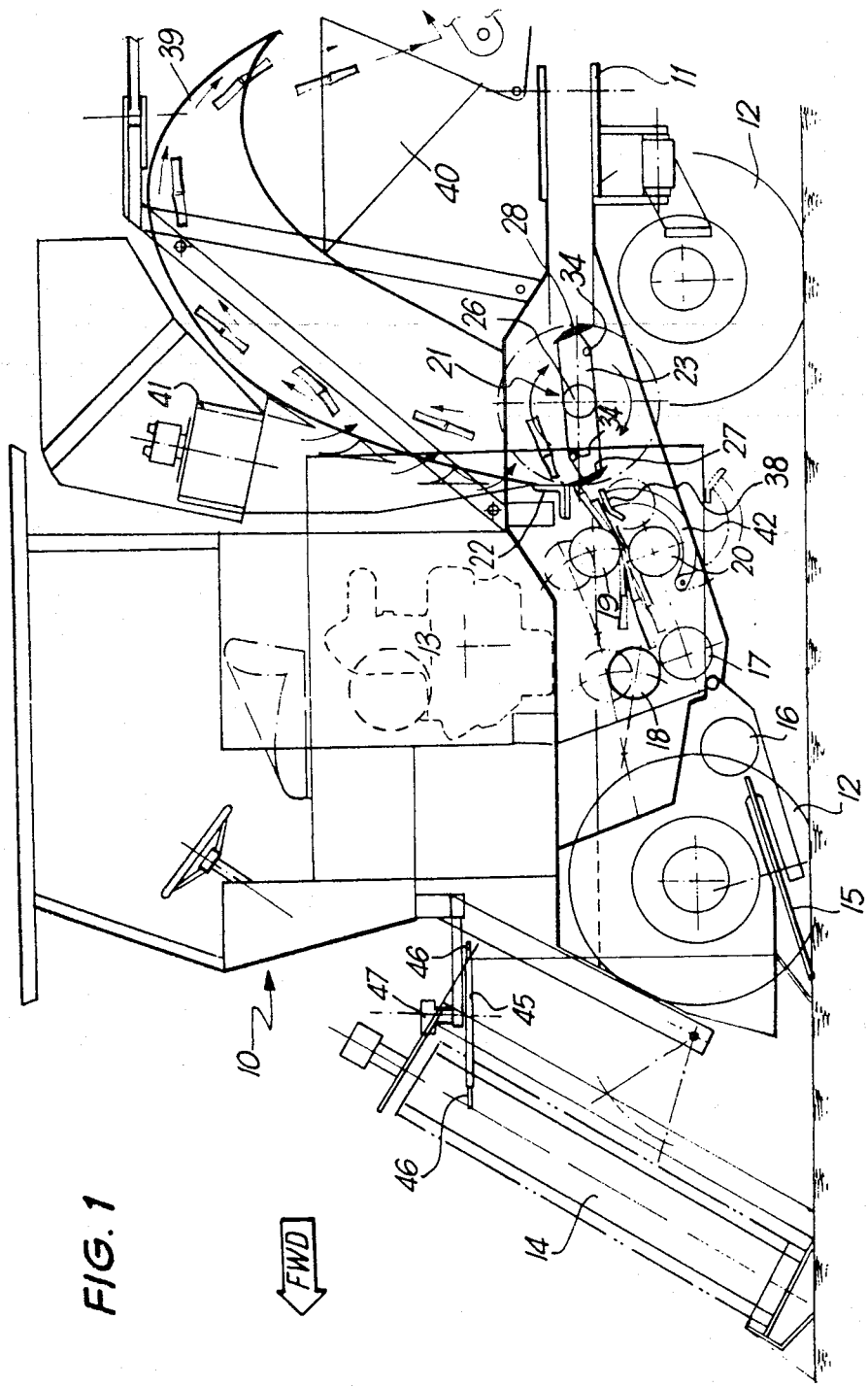
FIG. 1 is a partial cutaway side elevational view of a sugar cane harvester according to the present invention.

A cane harvester 10 comprises a chassis 11 mounted on wheels 12, the front pair of which are steerable. The wheels 12 are driven in a conventional manner from a motor 13 which also provides hydraulic power to drive the accessories on the harvester.

The harvester 10 is provided at its front end with a pair of conventional crop dividers 14 which are spaced apart to define a cane receiving throat. Sugar cane stalks entering the cane receiving throat are severed closely adjacent the ground by a base cutter 15 which is also of conventional design.

A disk 45 is mounted horizontally above the cane receiving throat of the harvester 10 and is provided with radially extending fingers 46. A reversible hydraulic motor 47 is provided above the disk 45 to drive it in either direction. This disk serves to push the cane stalks sideways, as they are cut. The direction of rotation of the disk is selected to rush the tops of the cut cane onto clear ground. The feed rollers 17 and 18 are biased together and serve to grip the cane stalks fed therebetween and to move them backwardly through the harvester to hydraulically driven feed rollers 19 and 20. The feed rollers 19 and 20 are similarly biased together and serve to positively feed the cane to the cutter means 21.

Figure 2:
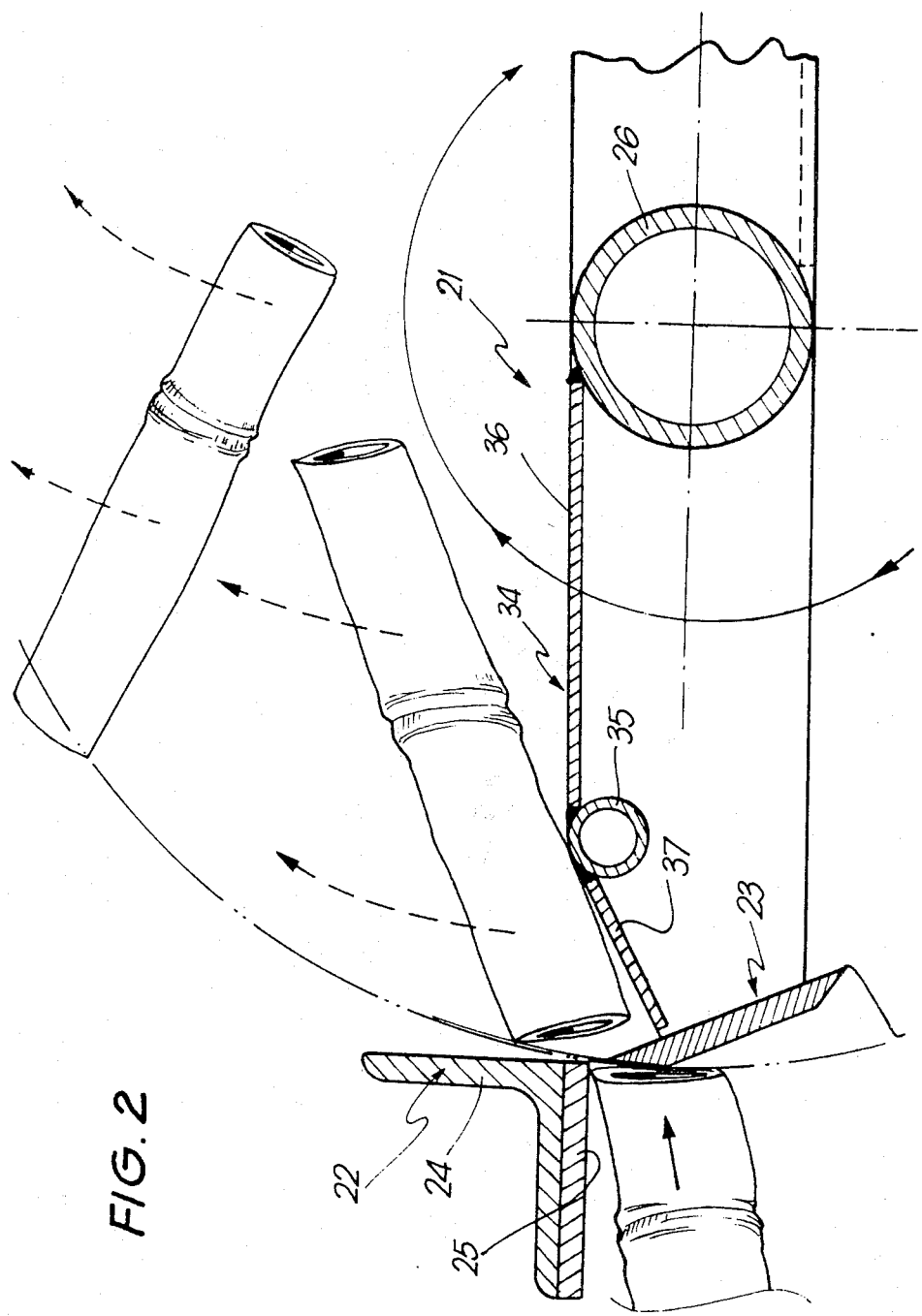
FIG. 2 is a diagrammatic cross sectional view of the billet chopping means of the sugar cane harvester of FIG. 1.
Figure 3:
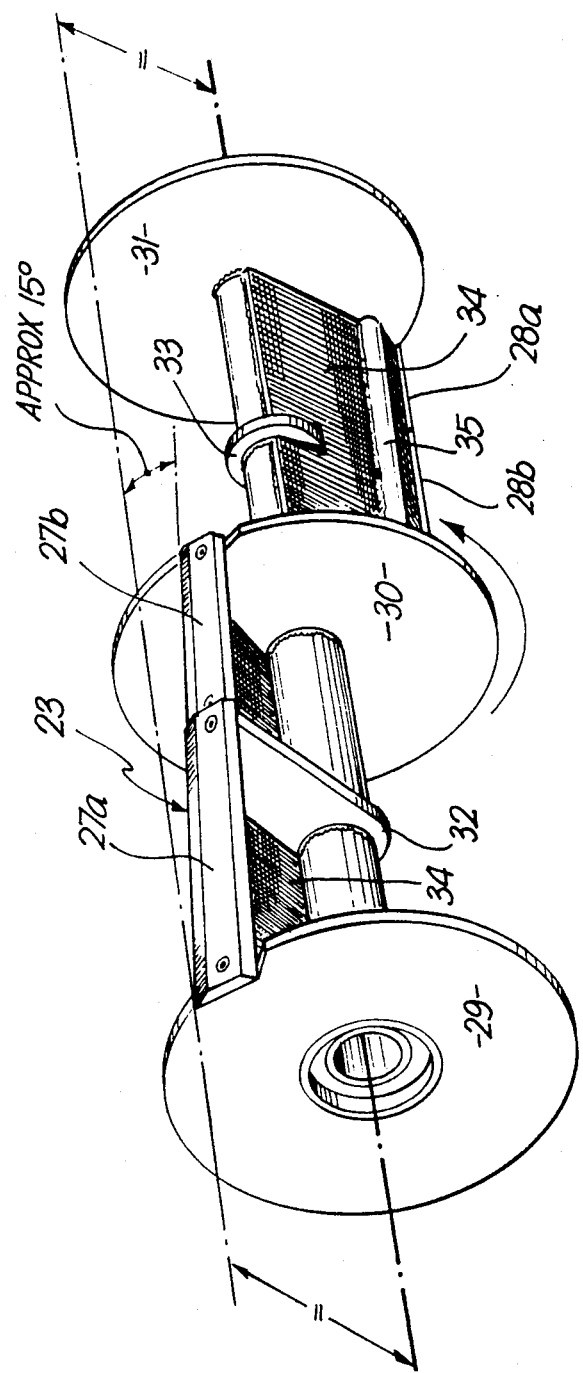
FIG. 3 is a perspective view of a spindle, blades and billet engaging means forming part of the billet chopping means of the sugar cane harvester of FIG. 1.

The anvil 22 comprises an anvil angle 24 and an adjustable fixed blade 25 (see FIG. 2). The cutter blade mechanism 23 comprises a spindle 26 which has a splined end (not shown) connected to a hydraulic motor (not shown), a pair of blade sets 27a, 27b and 28a, 28b held in spaced apart relation with the spindle by essentially annular plates 29, 30 and 31 and arms 32 and 33, and billet engagement means 34. The plate 29 is welded with its plane at right angles to the longitudinal axis of the spindle 26 at one end thereof and the plate 31 is similarly welded to the other end of the spindle 26. The plate 30 is similarly welded to the spindle 26 at the mid point between plates 29 and 31. Arm 32 is welded to, and projects radially from the arm at the mid point between plates 29 and 30. The arm 33 is similarly welded to the spindle 26 at the mid point between plates 30 and 31 but 180° out of phase with the arm 32. Blades 27a and 27b respectively are bolted to plate 29 and arm 32 and arm 32 and plate 30. Similarly blades 28a and 28b are respectively bolted to plate 31 and arm 33 and arm 33 and plate 30, the blade set 27a, 27b being thereby 180° out of phase with the blade set 28a, 28b.

The peripheral edges of the plates 29, 30 and 31 are recessed at the portions in which they are in juxtaposition with a blade to allow the blades to lie in a plane which is inclined by some 20° to the longitudinal axis of the cane stalks being fed by feed rollers 19 and 20 to the cutter means 21 as is seen in FIG. 2. The blade sets 27a, 27b lies along a longitudinal axis which is inclined some 15° to the longitudinal axis of the spindle 26. The longitudinal axis of the blade set 28a, 28b, is similarly inclined to the axis of the spindle 26 and the two blade sets 27a, 27b and 28a, 28b are inclined towards one another.

A billet engagement means 34 comprises a thrower tube 35 disposed between the spindle 26 and each of the blade sets 27a, 27b and 28a and 28b. In the case of the blade set 27a, 27b, the thrower tube 35 extends between and is welded to plates 29 and 30 while the thrower tube 35 associated with blade set 28a, 28b extends between and is welded to plates 30 and 31. In each case the space between the thrower tube 35 and spindle 26 is filled with baffle plate 36 while the space between the thrower tube 35 and the associated blade set 27a, 27b or 28a, 28b is filled with a baffle plate 37.

The leading edge of the thrower tube 35 projects forwardly, in the direction of rotation of spindle 26, of the radial line extending between the centreline of the spindle and the leading edge of the associated blade set by some 2 to 3 cm in a cutter blade mechanism 23 having a radius of 280 mm.

In use the spindle 26, and the associated cutter blade mechanism are caused to rotate at about 310 RPM. The cutter blade mechanism 23 thereby serves to act with the anvil 22 to sever sugar cane stalks placed therebetween into billets. The billets so formed are then thrown upwardly and backwardly by the cutter blade mechanism 23 in the manner shown diagrammatically in FIG. 2, the exact trajectory of the cut billets being variable by changing the position of the thrower tube 35 and baffle plates 36 and 37. As the billets are thrown upwardly the trash associated with the cane stalks, chiefly comprising leaves of the cane and other vegetable matter taken in with the cane tends to be carried around with the cutter blade mechanism as it rotates and drops downwardly onto the ground under the harvester 10.

Stiff portions of sugar cane fed backwardly by the feed rollers 19 and 20 will be fed directly to the cutter means 21 as it is cantilevered outwardly from the feed rollers. Less stiff portions of the sugar cane, however, such as cane tops, will not be cantilevered outwardly from the feed rollers 19 and 20 but will droop downwardly. These less stiff portions will thus be discharged downwardly onto the ground below the cutter mechanism. It will be recognised that this mechanism allows cane stalks to be billeted without having been "topped" prior to being introduced into the harvester.

Guide means 42 are provided on the harvester 10 and is pivotably movable between a position in which a sill 38 on the guide means 42 is disposed between the feed rollers 19 and 20 and the cutter means 21 and a position (shown in broken lines in FIG. 1) in which the sill 38 is displaced downwardly to allow the free discharge of less stiff portions of the sugar cane as described in the foregoing paragraph. Means are provided to allow an operator of the harvester 10 to pivot the guide means 42 between its two alternative positions from the driving seat. The presence of the guide means 42 is to allow the operator to optionally prevent portions of cane from being discharged downwardly between the feed rollers 19 and 20 and the cutter means 21. This may be desirable when harvesting tangled or flattened cane which might be received by the harvester top first rather than butt first. In this case the top will be fed to the cutter means, due to the stiffness of the cane below the top, and a butt portion corresponding in length to the distance between the feed rollers 19 and 20 and the cutter means 21 would be left to fall downwardly and be discharged from the harvester 10. The prevent this the operator can raise guide means 42 such that such butt portions will be directed by sill 38 to the cutter means 21 and will be carried by sill 38 into cutter means 21 by cane stalks following the butt portion being fed rearwardly by the feed rollers 19 and 20.

The billets severed and thrown by the cutter blade mechanism 23 pass upwardly through chute 39 into elevator bin 40. A hydraulically driven fan 41 is provided above chute 39 to direct an air blast downwardly across the trajectory of the billets thrown out by the cutter blade mechanism 23 and onto the cutter means 21. This air blast serves to provide an additional mechanism facilitating the separation of the cane billets from the trash and the downward discharge of the trash onto the ground beneath the harvester 10.

Many changes may be made in the specific embodiment described which changes may still fall within the spirit and scope of the invention as defined in the accompanying claims.

I claim:

1. A cane harvester comprising cutter means to cut cane, feed means to feed said cut cane longitudinally along a feed path, chopping means to chop said cane into billets, billet engaging means to engage said cane and billets and a discharge chute to discharge billets from said cane harvester, said chopping means comprising longitudinal movable blade means rotatable about an axis and operable to sweep a substantially cylindrical or frusto-conical path, fixed blade means mounted on said feed path and cooperating with said movable blade means, said movable blade means movable upwardly past said fixed blade means, said billet engaging means being located between said axis and said movable blade means and being rotatable with said movable blade means, said billet engaging means being operable to engage and pretension said cane prior to said cane being cut into billets and to throw said cut billets upwardly and away from said chopping means into said discharge chute.

2. A cane harvester as in claim 1 wherein said axis of said movable blade means is substantially perpendicular to said feed path and said movable and fixed blade means extend substantially across said feed path.

3. A cane harvester as in claim 2 wherein said billet engaging means extends along the length of said movable blade means and forwardly of a radial line drawn between said axis and the leading edge of said movable blade means.

4. A cane harvester as in claim 3 wherein said movable blade means are removable connected to a plurality of mounting plates extending outwardly from and substantially perpendicular to said axis.

5. A cane harvester as in claim 4 wherein said movable blade means are mounted to said mounting plate means in segment pairs, one of said segment pairs being mounted on one side of said mounting plate means and the other of said segment pairs being mounted 180° opposed of said one side of mounting plate means.

6. A cane harvester as in claim 4 wherein said billet engaging means comprises baffle and throwing means, a first portion of said baffle means extending from said axis to said throwing means and a second portion of said baffle means extending between said throwing means and said movable blade means.

7. A cane harvester as in claim 6 wherein said throwing means contacts said cane before said movable blade means.

8. A cane harvester comprising cutter means to cut a cane crop, feed means to feed said cut cane longitudinally along a feed path, chopping means to chop said cane into billets, billet engaging means to engage said cane and billets and discharge means to receive and discharge said billets, said chopping means comprising longitudinal movable and fixed blade means, said movable blade means movable upwardly past said fixed blade means and being rotatable about an axis located substantially perpendicular to said feed path and operable to sweep a substantially cylindrical or frusto-conical path, said movable and fixed blade means extending substantially across said feed path, said movable blade means being connected to mounting plate means extending substantially perpendicular from said axis, said billet engaging means comprising baffle and throwing means, said baffle and throwing means extending between said axis and said movable blade means, a first portion of said baffle means being connected between said axis and said throwing means and a second portion of said baffle means being connected between said throwing means and said movable blade means, said throwing means being operable to engage said cut cane prior to said cane being severed into billets by said movable blade means and to throw said cut billets upwardly and away from said chopping means into said discharge chute.

* * * * *